(12) United States Patent
Campbell

(10) Patent No.: US 12,056,687 B2
(45) Date of Patent: Aug. 6, 2024

(54) SYSTEM AND METHOD FOR MINING TOKENS WITH USER DATA

(71) Applicant: Orrin Campbell, Wappingers Falls, NY (US)

(72) Inventor: Orrin Campbell, Wappingers Falls, NY (US)

(73) Assignee: ORRIN VINCENT CAMPBELL, Wappingers Falls, NY (US)

( * ) Notice: Subject to any disclaimer, the term of this patent is extended or adjusted under 35 U.S.C. 154(b) by 194 days.

(21) Appl. No.: 17/574,566

(22) Filed: Jan. 13, 2022

(65) Prior Publication Data

US 2023/0222488 A1    Jul. 13, 2023

(51) Int. Cl.
| | |
|---|---|
| *G06Q 20/36* | (2012.01) |
| *G06Q 20/40* | (2012.01) |
| *H04L 9/32* | (2006.01) |
| *H04L 9/00* | (2022.01) |

(52) U.S. Cl.
CPC ....... *G06Q 20/3672* (2013.01); *G06Q 20/401* (2013.01); *H04L 9/3213* (2013.01); *H04L 9/3239* (2013.01); *G06Q 2220/00* (2013.01); *H04L 9/50* (2022.05)

(58) Field of Classification Search
CPC ............. G06Q 20/3672; G06Q 20/401; G06Q 2220/00; G06Q 20/065; H04L 9/3213; H04L 9/3239; H04L 9/50; H04L 9/3247; H04L 2209/42; H04L 2209/56
See application file for complete search history.

(56) References Cited

U.S. PATENT DOCUMENTS

| | | | | |
|---|---|---|---|---|
| 11,455,642 | B1* | 9/2022 | Jameson | G06Q 20/405 |
| 2015/0294308 | A1* | 10/2015 | Pauker | G06Q 20/02 |
| | | | | 705/67 |
| 2017/0322992 | A1* | 11/2017 | Joseph | G06F 16/25 |
| 2021/0390196 | A1* | 12/2021 | Lavine | G06F 21/604 |

FOREIGN PATENT DOCUMENTS

| | | | |
|---|---|---|---|
| AU | 2019201798 A1 * | 10/2020 | |
| CA | 3050487 A1 * | 1/2020 | G06F 12/1408 |

OTHER PUBLICATIONS

"Reliable vihicle data storage using blockchain and IPFS", Hyoeun Ye, 2021, Electronics (Year: 2021).*

* cited by examiner

Primary Examiner — Duan Zhang

(57) ABSTRACT

The present invention discloses a method or a system for verifying, storing and tokenizing data in cryptocurrency mining process by exchanging user data anonymously. The method comprises various steps like creating one or more smart contracts between a user and an application or platform or software, inputting by the user on a user device, user information onto the application or the platform or the software through an user interface, providing by the application or the platform or the software an option to store the inputted user information on to a server or database, confirming or verifying the storing of the user information onto the server or database, generating one or more digital tokens by the application or the platform or the software in response to the stored user information at the server or database, assigning by the application or the platform or the software, a blockchain network based wallet address to the user device and transferring by the application or the platform or the software, the generated tokens to the wallet address of the user.

19 Claims, 2 Drawing Sheets

SYSTEM AND METHOD FOR MINING TOKENS WITH USER DATA

1. FIELD OF THE INVENTION

The present invention generally relates to systems and methods for mining crypto currency in exchange of user data anonymously.

2. BACKGROUND OF THE INVENTION

A digital or virtual currency is a medium of exchange implemented through the Internet generally, not tied to any physical currency and typically designed to allow instantaneous transactions and borderless transfer of ownership. One example of virtual currency is cryptocurrency, wherein cryptography is used to secure transactions and to control the creation of new units.

Various cryptocurrencies exist in the market and the most well known is a blockchain-based cryptocurrency. Most blockchain-based cryptocurrency is decentralized in the sense that it has no central point of control. However, blockchain-based cryptocurrency can also be implemented in a centralized system having a central point of control over the cryptocurrency.

A blockchain is a data structure that stores a list of transactions and can be thought of as a distributed electronic ledger that records transactions between source identifier(s) and destination identifier(s). The transactions are bundled into blocks and every block (except for the first block) refers back to or is linked to a prior block in the blockchain. Computer resources (or nodes, etc.) maintain the blockchain and cryptographically validate each new block and the transactions contained in the corresponding block. This validation process includes computationally solving a difficult problem that is also easy to verify and is sometimes called a "proof-of-work". This process is referred to as "mining". The mining may be a random process with low probability so that a lot of trial and error is required to solve a computationally difficult problem. Accordingly, the mining may require enormous amounts of computational energy.

A miner is rewarded each time it generates a valid block. The process is referred to as mining. When the majority of the miners are honest, the longest chain, which has the greatest amount of proof-of-work effort invested in it, represents the consensus of the majority as to the content of the transactions being recorded.

The current mechanisms fall short in the ability to price the resulting data and do not provide accurate data capture or network or exchanges for data purchasing, development, and transaction.

Consumers' online profile data is commonly generated and monetized from consumer web searches, profile data, social media profiles, and online surveys that generate revenue through advertisement delivery with no compensation to the actual owners of the data, the individual consumers/users, consumer groups, organizations, and data generators themselves.

Data has a monetary value and users are not given the tools to be able to quantifiably assess and monetize their information in a system which maintains anonymity. Due to the evolution of cookies, internet users have their personal information scraped and sold to third party market makers without approval or compensation. These trackers contain sensitive information which gets leaked during security breaches and the user's data is exposed online. The lack of a system like blockchain integration allows data to be mishandled, lost and undervalued by market makers who profit from the user's data. This creates a disconnect where the users do not profit from their value creation.

Therefore, there is a need for efficient methods to compensate users for monetizing their data and utilizing the same for mining crypto currencies.

3. BRIEF SUMMARY OF THE INVENTION

The present invention is related to a method or a system for verifying, storing and tokenizing data in cryptocurrency mining process. Tokens are generated to users in exchange for the data may vary based on the volume, quantity, verification, and types of information included in the data. Compensation performed by the data platform may be performed utilizing known cryptocurrency mining methods and may fund the tokenization through traditional funding utilizing digital currencies or existing currencies. blockchain-based currencies may be utilized to compensate the users.

Some exemplary embodiments of the present disclosure may use personal information associated with a task provided to a user as a solution to "mining" challenges in cryptocurrency systems. The user is compensated for the personal information by mining cryptocurrencies when the user performs tasks provided by an information or service provider, such as answering questions in the form of short answer, multiple choice, scale, rating, poll and other market research, which can be used in the mining process.

Systems, methods, and hardware aspects of computer readable storage media are provided herein for a cryptocurrency system using user personal data. According to various embodiments of the present disclosure, a server may provide a task to a device of a user which is communicatively coupled to the server. An input display communicatively coupled to or comprised in the device of the user may receive user performance activity of the user for various tasks received from the server. User performance data may be generated based on the user performance activity of the user. A cryptocurrency system communicatively coupled to the device of the user may verify whether or not the user performance data satisfies one or more conditions set by the cryptocurrency system, and award cryptocurrency to the user whose performance data is verified.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

4. BRIEF DESCRIPTION OF THE DRAWINGS

The novel features of the disclosure are set forth here. A better understanding of the features and advantages of the present disclosure will be obtained by reference to the following detailed description that sets forth illustrative embodiments, in which the principles of the disclosure are utilized, and the accompanying drawings of which:

5. DETAILED DESCRIPTION OF THE INVENTION

Figure 1:
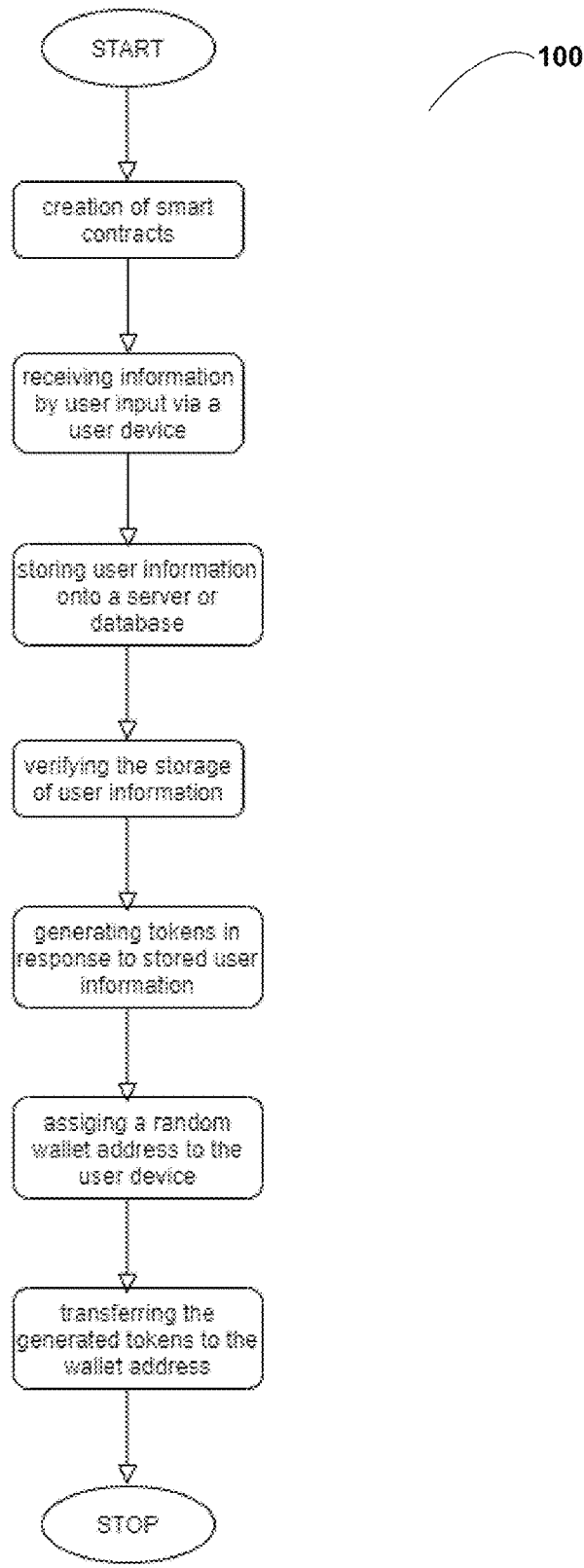
FIG. 1 illustrates a flow chart that includes various steps involved in cryptocurrency mining in exchange of user personal data or information anonymously.

In the following description, numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present disclosure are directed to a rights or permissions-independent token service in other words, a software service or a business system that enables users (e.g. individuals, organizations, automated agents/applications, etc.) to create, transact with, and manage tokens across multiple different distributed ledger networks/platforms without a need of obtaining rights or permissions from the content holder for the generation of the token or NFT or digital communication file.

In The foregoing and other aspects of the present disclosure are described in further detail in the sections that follow. It should be noted that the term "blockchain" is often used interchangeably with the term "distributed ledger"; Accordingly, the term "distributed ledger" as used herein should be broadly interpreted as including both blockchains and other types of distributed ledgers that do not employ this particular data structure/format.

The term "cryptocurrency" may mean a digital currency in which encryption techniques are used to regulate the generation of units of currency and verify the transfer of funds. Many cryptocurrencies include the use of a blockchain to provide security and prevent fraud as double spending. Some embodiments of the present disclosure may be used in alternate cryptocurrency mechanisms other than a blockchain. The system, method, and computer program products described herein may be applied to both centralized and decentralized cryptocurrency networks and databases.

In one embodiment, a platform for processing transactions wherein, digital agreements or smart contracts are executed between the user and the platform executed digitally and they exist across a distributed, decentralized blockchain network. Using smart contracts, the platform allows user or consumer devices interact with the platform without asking for identification, certificates or authentication.

In another embodiment, the device of the consumer or user is assigned with a seemingly random but unique address in order to have a consistent address for routing, transacting or collecting data.

FIG. 1 illustrated a method 100 for a user to mine cryptocurrency includes: inputting by a user on a user device, user information into a platform or software, providing by the platform or software to the user an option to store the inputted information on to a server or database, confirming or verifying storage of the user information onto the server or database, creating smart contracts between the user and the platform, generating tokens on a blockchain network in response to the stored user information at the server or database and the generated tokens are assigned to a wallet address of the user on the blockchain network.

Figure 2:
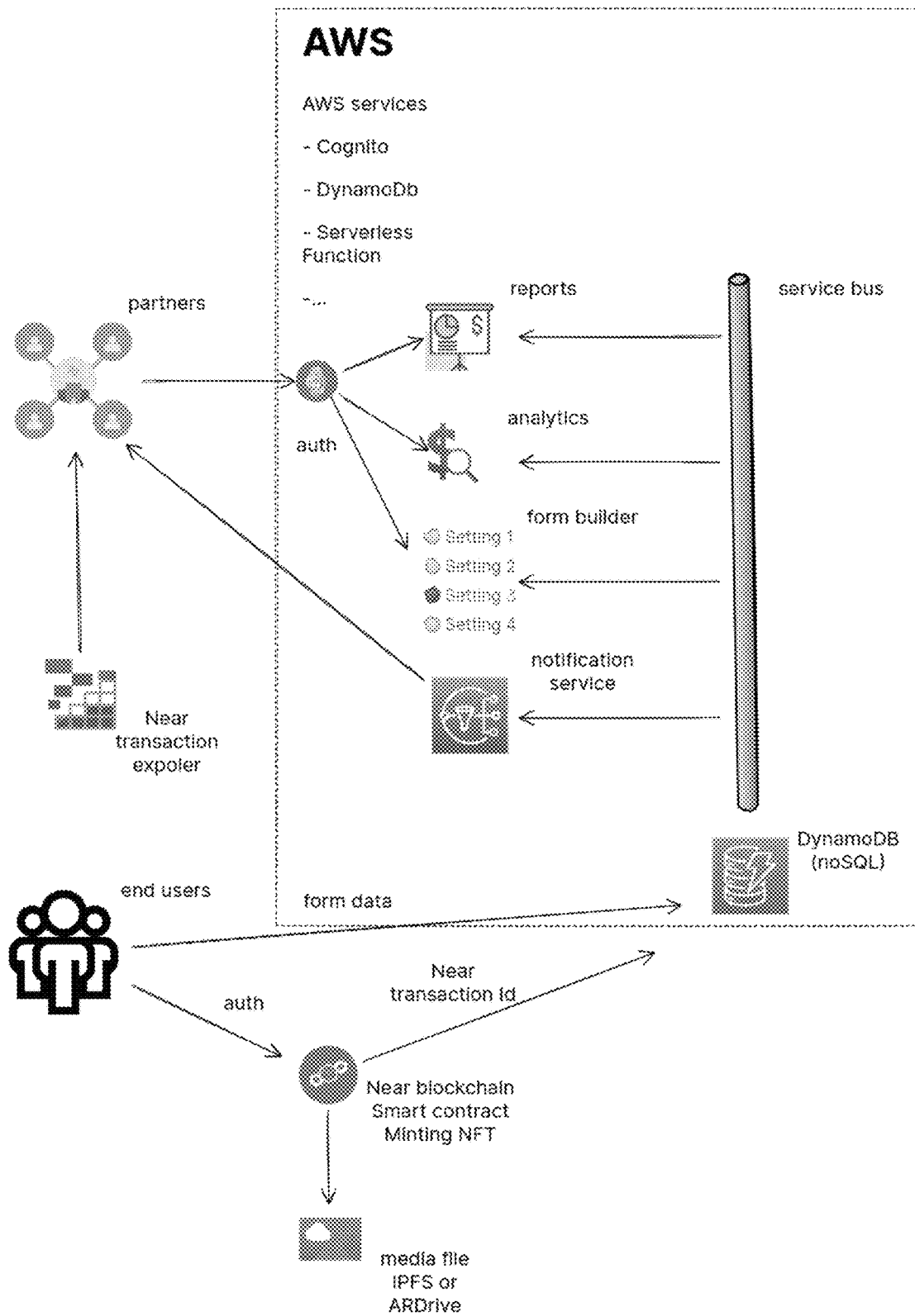
FIG. 2 illustrates an architecture of the cryptocurrency mining system.

FIG. 2, illustrates an architecture of a system 200 that is provided for monetizing user data by providing tokens in exchange of the user data. The system includes one or more user devices for executing a data exchange application, wherein the application is configured to provide date storage access to the user. The data obtained from the user is securely stored in a blockchain network linked database server and is hashed to secure the data from accessing without permission. The application receives an input from a user associated to the data, stores the data associated with the user, the data stored on the blockchain network is verified by the user, one or more tokens are generated on the blockchain network in exchange to the stored user data, and the generated tokens are assigned to a wallet address associated to the user.

In one embodiment, smart contracts for e.g. digital agreements are created between a service provider associated with the application, and the user which helps the user in accessing the application without any need for identification, verification or authentication.

In other embodiment, the wallet address associated with the user is randomly generated by the service provider for routing, transacting or collecting the data associated with the user and the tokens.

In another embodiment, the tokens includes but not limited to cryptocurrency, virtual currency, digital currency, Non-Fungible Tokens etc. and can also be swapped for any type of currency or any tokenized assets.

In one embodiment, the service provider can request for personal or specific information from the user and upon acceptance for exchanging of the user data tokens are generated. The users may be rewarded for additional data but not limited to uploads, updates, additions, amendments, surveys/questionnaire etc. The tokens may be utilized to but not limited to pay a vendor or third party for a product or a service.

In another embodiment, one or more transactions between the user and the application are logged at the blockchain network for e.g. transaction audit logs and other traceability features of blockchain based communications disclosed herein provide support for preservation of data input and transparency of transactions (e.g. token mint, issuance). As an example, if a party wants to determine when, if or how a token was issued for their input, the prior data of the blockchain is readily available and traceable to do so.

In an embodiment, the user data may be dissociated from the user for securely managing the data for the user. The generated token may be a blockchain token that includes an encryption key for accessing the user data, and wherein the user data is stored in a blockchain ledger in communication with the application. The blockchain ledger records all the transactions and maintains the transaction history as a log.

In an embodiment, the service provider may may generate tokens through the application, that are representative of the user data and may be listed on private or public exchange. The tokens are used for the purpose of secure access and monetization of the user data. Tokenization of data may represent any number of existing, custom/proprietary, and other data objects and are listed in short name form upon the exchange. The tokens enable access, valuation of the user data and may include a characterization of the data source, a reference and access to the specific user data related to the transaction.

In another embodiment, the tokens may be issued, regulated, managed, and distributed by the service provider through a blockchain network platform to comply with the existing regulatory framework of commodity and asset exchanges. The platform may provide a data monetization process for creating and performing transactions between the users and the service provider. The token may allow the user to directly control and monetize their data in a transparent and secure blockchain network based platform. Users or Consumers may receive tokens in several ways when they sign up to participate in the service, when and where they opt in to include their data in the marketplace, and when corporations and/or third parties purchase or want access to monetize the user data.

In another embodiment, the user data includes but not limited to data associated to user's social network profile, customized profile, or personal information etc.

In one embodiment, the application may enable the user to track utilization and monetization process of their data more transparently. The user may be able to access and track revenue outcome, price appreciation, or other forms of asset monetization. For example, a value-based reward system tracked utilizing blockchain may be implemented. Smart contracts are utilized with blockchain to ensure proper utilization and monetization of the data for verification purposes. The token generation process in exchange of the user data/profile provides proof of ownership to the user and ensures contract conditions are written into the smart contract code within the blockchain structure. The blockchain records maintain and track the creation, issuance, management, and monetization of each token throughout the lifetime of the user's involvement and ownership of their data.

In one embodiment, the user may be prompted, incentivized and rewarded by the service provider with additional tokens for sharing their data/profile as well as for additional participation in surveys, watch a video, verify, a purchase, add studies, product marketing, expanded data provisioning, and questionnaires.

In other embodiment, The user may be incentivized to provide additional data, but not limited to pictures, audio content, videos, sharing access to third-party applications, search data, views, likes, shares, comments etc. The user data that is recorded and stored may reside permanently on the blockchain. Thus, the user is incentivized to maintain, share, and update their data.

In another embodiment, the users are rewarded for sharing specific data required by the advertisers or third parties. The data stored on the blockchain network can be purchased by advertisers who provide incentives, rewards, or donations in exchange for access to the users data and can be used for analytics, marketing, and advertisement targeting.

The devices, systems, components and equipment of the system may include but not limited to, computing and telecommunications components, devices or elements which may include processors, memories, caches, busses, motherboards, chips, traces, wires, pins, circuits, ports, interfaces, cards, converters, adapters, connections, transceivers, displays, antennas, operating systems, kernels, modules, scripts, firmware, sets of instructions, and other similar components and software that are not described herein for purposes of simplicity.

In one embodiment, the system may be utilized by any number of users, organizations, or providers to aggregate, manage, review, analyze, process, tokenize, distribute, advertise, market, display, and/or monetize the user data. For example, the user data may be utilized in marketing or advertisements for goods or services.

In one embodiment, the goods and services represent any number of items, content, products, or services sold by a business, entity, organization, or entity.

In one embodiment, the system may utilize any number of secure identifiers (e.g., passwords, pin numbers, certificates, etc.), secure channels, connections, or links, virtual private networks, biometrics, or so forth to upload, manage, and secure the data, generate tokens, and perform applicable transactions. As noted, the system may be a blockchain network system that utilizes a digital ledger to document and track transactions involving the data or utilization thereof.

In another embodiment, the device includes but not limited to, mobile, desktop, tablet, laptop or common devices that may be utilized to receive and manage data and perform transactions. Other examples of devices may include e-readers, cameras, video cameras, audio systems, gaming devices, vehicle systems, kiosks, point of sale systems, televisions, smart displays, monitors, entertainment devices, medical devices, virtual reality/augmented reality systems, or so forth. The devices may communicate wirelessly or through any number of fixed/hardwired connections, networks, signals, protocols, formats, or so forth.

In another embodiment, the user as explained in various embodiments can be an individual, a company or any interested entity.

In one embodiment, the inputting of the user data on to the device is done via an input device that can include a keyboard, pointing devices (e.g., mouse, trackball, touchpad, etc.), a touch-screen incorporated into a display, audio input devices (e.g., voice recognition systems, microphones, etc.), motion-based controllers, and other types of input devices. In general, use of the term "input device" is intended to include all possible types of devices and mechanisms for inputting information.

In one embodiment, the system includes servers and databases. The servers may include but not limited to a web server utilized to provide a website, mobile applications, and user interface for interfacing with numerous users. The user data received by the web server may be managed by the service providers managing the servers and associated databases. For example, the web server may communicate with the database to respond to read and write requests. The servers may include one or more servers dedicated to implementing and recording blockchain transactions and communications involving the user data. The databases may store a digital ledger for updating information relating to the user's data as well as utilization of that data. The databases may utilize any number of database architectures and database management systems (DBMS) as are known in the art. The databases may store the content associated with each user/consumer/purchaser which may specify an address, name, age, demographics, interests, family/friend information, biometric identifiers, payment information, permissions, settings, location, cause preferences, cause restrictions, and so forth. Any number of secure identifiers, such as tones, QR codes, serial numbers, or so forth may be utilized to ensure that content, personal, or transaction information is not improperly shared or accessed.

In one embodiment, the user interface may be made available through the various devices of the system. The user interface represents a graphical user interface, audio interface, or other interface that may be utilized to manage user data and information. For example, the user may enter or update associated data utilizing the user interface (e.g., browser or application on a mobile device).

In another embodiment, the platform may utilize artificial intelligence. The artificial intelligence may be utilized to enhance data and increase its value. For example, artificial intelligence may be utilized to review, authenticate, and validate data that is received by the platform. The artificial intelligence of the platform may be utilized to ensure that the user data is improved, accurately analyzed, and value increased.

In one embodiment, the platform may extract the user data from third-party platforms by opting in and providing user credentials to various applications (e.g., Facebook, Twitter, Reddit, News Sites, Amazon, Google, etc.) the platform may extract data from different sources.

In another embodiment, the application running on the platform may request user for additional user data such as but not limited to behavioral information, psychological, mood data, and other intangible data. The user data may be validated through artificial intelligence, machine learning, human analysts/consultants, or other automated or manual processes.

The users may be incentivized or prompted to upload data to the application. The application may also receive amended, updated, or additional data from the users at any time as described herein. The users may have a digital agreement for the distribution of the user data to the third-party sellers or other interest parties. The digital agreement or smart contract may specify how, when, and what portions of the user data may be used as well as the associated compensation terms. The digital agreement may specify that the user data may be purchased, licensed, rented, leased, or otherwise managed by the system.

In one embodiment, the tokens generated for the users in exchange for the user data may vary based on the volume, quantity, verification, and types of information included in the user data. Blockchain-based currencies may be utilized to compensate the users. Full tokens or partial tokens may be utilized to most accurately represent the values being exchanged. The user may be compensated with tokens (e.g., Bitcoin, Ethereum, LTC, Doge or other proprietary tokens, etc.)

In another embodiment, the method for mining for tokens with user data includes various steps: executing one or more smart contracts between the user and an entity and recorded on a decentralized blockchain network for providing access to an application of the entity; assigning by the application a unique address to a user device for routing, transacting or collecting the user data; obtaining an input at the application from the user related to the user data; storing by the application the user data in a storage; verifying by the user the stored data in the storage; analysing the stored data by the application for confirming the data input; subsequently generating tokens by the application in exchange for the stored data and transferring the generated tokens to the unique address of the user's device.

In one embodiment, cryptographic hash addresses are used as a unique address for the user device, this allows the users to input their information and hide identity as well as connection to the information. The users can anonymously store their information and verify whether they want to store data in exchange for digital tokens.

In another embodiment, public and private keys are generated by the application for the stored data through cryptography. The user is provided with the private key and can verify the user data with the private key. The public key generated by the application for the user data can be utilized to verify user signature for that particular user data. The public key can be a unique identity or a random address generated for the user device.

In other embodiment, if the user verifies or confirms to store the user data into a database or storage, the application scans and confirms the data stored in the database or the storage and generates digital tokens.

In another embodiment, the user can control the access to the user data and can assign permissions to the application providers or any entities to utilize the user data in exchange of any monetary benefit. The monetary benefit includes tokens, NFT's or any crypto currency but can also include physical currency or any vouchers.

In other embodiment, upon verification using the private key, user will have their information stored and have a record of this transaction on the blockchain network. The user can check who and where the user data is being used.

In another embodiment, the tokenization process happens on the blockchain network and is executed by smart contracts, these events are transacted on the blockchain network, giving us a public record as well as a digital map where the tokens can be stored and maintained.

In one embodiment, the system for mining tokens with user data may also include one or more devices utilized to enable, initiate, generate, aggregate, analyze, process, and manage data, transactions, and so forth with one or more communications or computing devices. The one or more devices networked to manage the cloud network and the system. The system may include any number of servers, routers, switches, or advanced intelligent network devices.

In another embodiment, a new and unique wallet is created each time user interacts with the application or platform or software. A new wallet is created to allow the user to create a new "persona" under which they can operate In other embodiment, user identity is verified using a third party KYC or verification tool from which they can begin to act anonymously once they have verified their identity or single presence In another embodiment, a double username function is created by the application or platform, which allows user to sign in as one name, and then operate as another with or without kyc.

In one embodiment, the system can be configured in a way where the user inputs personal information into a "digital plug-in" or "browser attachment" which also tracks certain digital or personal information and reports or confirms the certain digital or personal information to the application or platform or software which issues tokens and perform various transactions.

In another embodiment, the system is configured where, the user inputs data or information and tokens are generated as a reward in the form of an NFT which stores information and user earns a specific dividend (tokens) upon confirmation of information on blockchain network. The user can also receive NFT as a token associated with the user information, which can be resold within the platform i.e. a marketplace.

In one embodiment, the user stores information in a central or decentralized file storage solution, and all aspects can be interchangeably hosted on a combination or sole storage solution (e.g. data hosted decentrally, tokens issued centrally, NFT hosted centrally)

In another embodiment, The system can be a cloud system or cloud network that represents a cloud computing environment utilized to aggregate, process, manage, sell, monetize, and distribute data and support the associated transactions and utilization. The cloud system may implement a blockchain system for managing the data. The cloud system allows goods and services from multiple businesses, users, managers, or service providers to be centralized.

In one embodiment, for the block chain and smart contracts, the user data or information can be decentralized and distributed across multiple devices in a peer to peer network. The system, method, and computer program products described herein may be applied to both centralized and decentralized cryptocurrency networks and databases.

In one embodiment, the users can earn a token for the data or information input and the tokens can be credits that are generated using a digital credit system associated to the user and the platform or application or software. The credits are generated when appropriate or based on a specific calendar or schedule (e.g. quarterly or weekly or yearly)

In another embodiment, credits generated by the existing digital credit system for e.g. credit card or debit card or voucher etc. can be converted to digital tokens and can also be exchanged for any type of tokens.

In one embodiment, the system could operate as a Decentralized Autonomous Organizations (DAO) with smart contracts automatically handling all the interactions, processing, mining and token issuance with users using the tokens or credits as a voting system or governance system.

The system explained herein can be a computer system and the computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, system memory, and bus that couples various system components including system memory to processor. Processor may include software module that performs the methods described herein. The module may be programmed into the integrated circuits of processor, or loaded from memory, storage device, or network or combinations thereof.

Bus may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus. Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory can include computer system readable media in the form of volatile memory, such as random access memory (RAM) and/or cache memory or others. Computer system may further include other removable/non-removable volatile/non-volatile computer system storage media. By way of example only, storage device can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces.

Computer system may also communicate with one or more external devices such as a keyboard, a pointing device, a display, etc; one or more devices that enable a user to interact with computer system; and/or any devices (e.g., network card, modem, etc.) that enable computer system to communicate with one or more other computing devices. Such communication can occur via Input/Output (I/O) interfaces.

Computer system can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Aspects of the present disclosure are described with reference to flowchart illustrations and/or block diagrams of methods, apparatus (systems) and computer program products according to some embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

The present invention may be embodied in other specific forms without departing from its spirit or essential characteristics. The described embodiments are to be considered in all respects only as illustrative and not restrictive. The scope of the invention is, therefore, indicated by appended claims rather than by the foregoing description. All changes which come within the meaning and range of equivalency of the claims are to be embraced within their scope.

I claim:

1. A method for mining tokens with user information or data of a user, comprising:
    creating one or more smart contracts between the user and an application, wherein the one or more smart contracts specify how, when and what portions of the user information or data can be used by one or more third parties;
    storing the created smart contracts on a blockchain;
    obtaining one or more inputs of user information or data by the user onto the application or software through a user interface of a user device;
    assigning by the application a private key and a public key to the user information;
    verifying the user information by digitally signing the user information with the private key;
    verifying the digitally signed user information by using the public key;
    storing anonymously the user information or data on to the blockchain in response to verification of the user information with the private key;
    confirming or verifying the storing of the user information or data onto the blockchain;
    generating one or more blockchain tokens by the application in response to the storing of the user information or data;
    assigning a blockchain network-based wallet address to the user device;
    transferring the generated blockchain tokens to the blockchain network-based wallet address; and
    recording one or more transactions associated with the generation and utilization of the blockchain tokens on a blockchain ledger.

2. The method of claim 1, wherein the inputted user information or data is encrypted using a hash algorithm by the application.

3. The method of claim 1, wherein the one or more third parties provides rewards to the user for allowing access to the user information or data, wherein the rewards includes but not limited to digital tokens, cryptocurrency, virtual tokens, physical currency in digital form or Non-Fungible Tokens and can also be swapped for any type of currency or token.

4. The method of claim 1, wherein the user information or data can be generated when the user performs a task displayed on the user device by the application.

5. The method of claim 1, wherein the blockchain tokens generated by the application can be used for making transactions on various ecommerce websites, application or any physical shops.

6. The method of claim 1, the user device further comprises:
    a. a display, wherein the display displays the application;
    b. a touch screen attached to the display for accepting inputs from the user; and
    c. one or more electronic components for processing the one or more transactions of the data storage and other processes.

7. The method of claim 1, wherein the one or more third parties comprises entities other than the user, advertisers or companies.

8. The method of claim 1, wherein the private key is used by the user to control the access to the user information or data and the public key is used by other entities to verify the authenticity of the user information or data.

9. The method of claim 1, wherein the data or information can be stored on a database, a local storage, a cloud storage or a server.

10. A system for mining tokens in exchange of user data anonymously, comprising:
    at least one processor; and
    a memory communicatively coupled to the at least one processor, the memory storing instructions which, when executed by the at least one processor, cause the at least one processor to perform operations comprising:
    creating one or more smart contracts between a user and a platform or application or software, wherein the one or more smart contracts specify how, when and what portions of the user information or data can be used by one or more third parties;
    storing the created smart contracts on a blockchain;
    obtaining one or more inputs of user information or data by the user onto the platform or application or software through an user interface of a user device;
    assigning by the application a private key and a public key to the user information;
    verifying the user information by digitally signing the user information with the private key;
    verifying the digitally signed user information by using the public key;
    storing anonymously the user information or data on to the blockchain in response to verification of the user information with the private key;
    confirming or verifying the storage of the user information or data onto the blockchain;
    generating one or more blockchain tokens by the application in response to the storing of the user information or data;
    assigning a blockchain network-based wallet address to the user device;
    transferring the generated blockchain tokens to the blockchain network-based wallet address; and recording one or more transactions associated with the generation and utilization of the blockchain tokens on a blockchain ledger.

11. The system of claim 10, wherein the system for mining tokens further comprises:
   a. rights or permissions-independent token service; and
   b. a transaction maintaining service for processing one or more transactions, wherein the system is further configured to create, transact with, and manage the digital tokens across multiple different distributed ledger networks/platforms without a need of obtaining rights or permissions from the user for the generation of the digital token.

12. The system of claim 10, wherein the one or more third parties provides rewards to the user for allowing access to the user information or data, wherein the rewards includes but not limited to digital tokens, cryptocurrency, virtual tokens, physical currency in digital form or Non-Fungible Tokens and can also be swapped for any type of currency or token.

13. The system of claim 10, wherein the user includes but not limited to individuals, organizations or automated agents/applications.

14. The system of claim 10, wherein the digital agreements or smart contracts executed between the user and the platform or application or software are executed digitally on a distributed and decentralized blockchain network and allows the user device to interact with the platform without the requirement for identification, verification or authentication of the user.

15. The system of claim 10, wherein the wallet address assigned to the user device is randomly generated by the platform or application or software for routing, transacting or collecting the user information or data represented by the blockchain tokens.

16. The system of claim 10, wherein the application or platform or software can request for personal or specific information from the user and upon acceptance for exchanging of the user data, tokens are generated, wherein the user may be rewarded for additional data but not limited to uploads, updates, additions, amendments or surveys/questionnaire and the tokens may be utilized to but not limited to pay a vendor or third party for a product or a service.

17. The system of claim 10, wherein the communication between the user and the application or platform or software are logged at the blockchain network which includes transaction audit logs and other traceability features of blockchain based communications to provide support for preservation of data input and transparency of transactions such as token mint or issuance and, if any third-party wants to determine when, if or how a token was issued for the user input, the prior data of the blockchain is readily available and traceable to do so.

18. The system of claim 10, wherein the user data or information includes but not limited to data associated to user's social network profile, customized profile, or personal information.

19. The system of claim 10, wherein the inputting of the user data on to the user device is done via an input device that includes but not limited to a keyboard, pointing devices such as mouse, trackball, touchpad, a touch-screen incorporated into a display, audio input devices like voice recognition systems, microphones, motion-based controllers, or any other types of input devices.

* * * * *